US010380385B1

(12) United States Patent
Hughes et al.

(10) Patent No.: US 10,380,385 B1
(45) Date of Patent: Aug. 13, 2019

(54) VISUAL SECURITY DEVICE

(71) Applicant: Seagate Technology LLC, Cupertino, CA (US)

(72) Inventors: James Prescott Hughes, Palo Alto, CA (US); Alison Emily Fenn, Fort Collins, CO (US)

(73) Assignee: Seagate Technology LLC, Cupertino, CA (US)

( * ) Notice: Subject to any disclaimer, the term of this patent is extended or adjusted under 35 U.S.C. 154(b) by 380 days.

(21) Appl. No.: 14/172,556

(22) Filed: Feb. 4, 2014

(51) Int. Cl.
*G06F 21/88* (2013.01)

(52) U.S. Cl.
CPC .................................. *G06F 21/88* (2013.01)

(58) Field of Classification Search
CPC ................................................ H04L 2209/12
See application file for complete search history.

(56) References Cited

U.S. PATENT DOCUMENTS

| | | | |
|---|---|---|---|
| 3,848,265 A | 11/1974 | Biery et al. |
| 4,044,386 A | 8/1977 | Takateru et al. |
| 4,380,030 A | 4/1983 | Haruo |
| 4,665,456 A | 5/1987 | Ahlberg et al. |
| 5,087,998 A | 2/1992 | Oishi |
| 5,097,377 A | 3/1992 | Hardisky |
| 5,331,499 A | 7/1994 | Marcusen |
| 5,418,672 A | 5/1995 | Tischler |
| 5,828,534 A | 10/1998 | Lou |
| 5,956,633 A | 9/1999 | Janhila |
| 6,292,899 B1 | 9/2001 | McBride |
| 6,871,063 B1 | 3/2005 | Schiffer |
| 6,944,769 B1 | 9/2005 | Daniels |
| 6,980,659 B1 | 12/2005 | Elliott |
| 7,753,266 B2 * | 7/2010 | Harris ................... G06K 7/0021 235/380 |
| 7,758,422 B2 | 7/2010 | Davis |
| 7,865,735 B2 | 1/2011 | Yiachos |
| 8,230,235 B2 | 7/2012 | Goodman |
| 8,489,901 B2 | 7/2013 | Boudreaux |
| 8,533,494 B2 | 9/2013 | Harada |
| 8,549,619 B2 | 10/2013 | Bumpus |
| 8,607,359 B2 | 12/2013 | Pratt |
| 2002/0014955 A1 * | 2/2002 | Klitsgaard .............. A45C 13/24 340/10.42 |
| 2002/0104019 A1 * | 8/2002 | Chatani ................... G06F 21/10 726/27 |

(Continued)

FOREIGN PATENT DOCUMENTS

EP 0911738 4/1999

OTHER PUBLICATIONS

Emmett Dulaney, Sep. 29, 2011, "How—and Why—to Destroy Old Flash Drives" found at (http://campustechnology.com/Articles/2011/09/29/How-and-Why-To-Destroy-Old-Flash-Drives.aspx?Page=1).*

*Primary Examiner* — Simon P Kanaan
(74) *Attorney, Agent, or Firm* — Cesari & Reed LLP; Kirk A. Cesari

(57) ABSTRACT

A system can include a removable, non-reattachable security device and a circuit configured to stop or alter the operation of the system when the removable non-reattachable security device is not present. The removable, non-reattachable security device can be a key, an encryption device, or other device necessary to allow access to some or all of the system's functions, including access to encrypted data.

20 Claims, 4 Drawing Sheets

(56) References Cited

U.S. PATENT DOCUMENTS

| | | | |
|---|---|---|---|
| 2002/0133713 A1* | 9/2002 | Fieschi | G06F 21/88 |
| | | | 726/26 |
| 2002/0157012 A1* | 10/2002 | Inokuchi | G06F 21/10 |
| | | | 713/193 |
| 2003/0182579 A1* | 9/2003 | Leporini | H04N 5/913 |
| | | | 713/150 |
| 2005/0149745 A1 | 7/2005 | Ishidoshiro | |
| 2005/0210234 A1* | 9/2005 | Best | H04K 1/00 |
| | | | 713/151 |
| 2005/0262361 A1* | 11/2005 | Thibadeau | G06F 21/80 |
| | | | 713/193 |
| 2006/0041934 A1* | 2/2006 | Hetzler | G06F 12/1466 |
| | | | 726/9 |
| 2006/0179048 A1* | 8/2006 | Doumuki | H04L 12/2805 |
| 2008/0278903 A1* | 11/2008 | Ni | H05K 5/026 |
| | | | 361/679.32 |
| 2009/0046858 A1 | 2/2009 | Iyer | |
| 2010/0017621 A1* | 1/2010 | Crawford | G06F 21/72 |
| | | | 713/189 |
| 2013/0117488 A1 | 5/2013 | Perry | |

* cited by examiner

VISUAL SECURITY DEVICE

SUMMARY

In an embodiment, a device may comprise a security apparatus, and a circuit coupled to the security apparatus configured to allow execution of one or more functions based on a presence of the security apparatus. Further, the security apparatus can be adapted to be removable from the circuit and not reattachable to the circuit.

In an embodiment, a device may comprise a security apparatus including an attachment mechanism adapted to allow a one-time removal of the security apparatus from a circuit to which the security apparatus is coupled. Further, the circuit can include one or more circuits configured to determine if the security apparatus is coupled to the circuit, and to not allow access to one or more functions when the security apparatus is not coupled to the circuit.

In an embodiment, a method may comprise removing a security apparatus to permanently prevent access to one or more functions, and determining when a security apparatus is not coupled to a device. Further, the method can include prohibiting access to functions when the security apparatus is not coupled to the device.

DETAILED DESCRIPTION

In the following detailed description of the embodiments, reference is made to the accompanying drawings which form a part hereof, and in which are shown by way of illustrations. It is to be understood that features of the various described embodiments may be combined, other embodiments may be utilized, and structural changes may be made without departing from the scope of the present disclosure. It is also to be understood that features of the various embodiments and examples herein can be combined, exchanged, or removed without departing from the scope of the present disclosure.

In accordance with various embodiments, the methods and functions described herein may be implemented as one or more software programs running on a computer processor or controller. Dedicated hardware implementations including, but not limited to, circuits, controllers, system on chip (SOC), application specific integrated circuits, programmable logic arrays, and other hardware devices can likewise be constructed to implement the methods and functions described herein. Further, the methods described herein may be implemented as a computer readable storage medium or device including instructions that when executed cause a processor to perform the methods.

The present disclosure provides systems and devices to allow electronic devices, such as data storage devices (e.g. solid state devices, flash drives, hard disk drives, etc.), communication devices (cell phones, radio communication devices, etc.), or devices that perform specific functions (e.g. radar, sonar, etc.), to be disabled when data or functions are no longer needed. In some situations, a user may want to permanently restrict access to some or all data on a data storage device (DSD). In other situations, a user may wish to permanently disable communication functions of a communication device, such a mobile phones, or devices that remotely control machinery. A user may also want to see immediate visual evidence of a device's disablement or destruction so that they can be confident the functions or data have been permanently disabled.

Figure 1A:
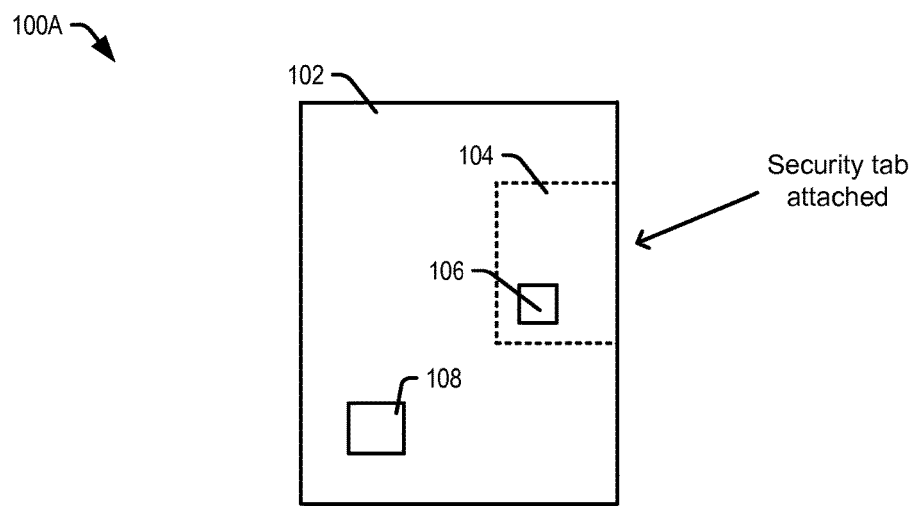
FIG. 1A is a system of visual security device, in accordance with certain embodiments of the present disclosure.

Referring to FIG. 1A, a system of visual security device is shown and is generally designated 100. System 100 can have an electronic device 102 coupled to a breakaway tab 104. The breakaway tab 104 can include a security circuit 106, which can be a security key, an encryption circuit, a memory, or other device that can be uniquely paired with the electronic device 102. FIG. 1A shows system 100 in a first state where the breakaway tab 104 is coupled to the electronic device 102. When the breakaway tab 104 is physically coupled to the system 100, certain functions may be enabled or executed. The electronic device 102 can also have stored instructions that, when executed by a processor (not shown), run enabled functions 108; examples of enabled functions 108 can be data transmission, processor operations, multimedia operations (e.g. audio output, display output), and so forth.

The electronic device 102 can be equipped with the breakaway tab 104, which can contain information or security functions needed by the device 102 to operate associated functions. The breakaway tab 104 could include decryption circuitry, a security key, or a memory, and may be coupled to the device 102. The tab 104 can be a pull-tab, a breakaway lever, a sticker, a breakaway portion of a printed circuit board, or other mechanism that could provide a quick, visually evident, and non-reversible (e.g. permanent) way of physically altering the electronic device 102 by removal of the tab 104. The tab 104 can be made of metals, plastics, composites, or other material, or any combination thereof, and may be affixed to the device 102 via mechanical means (e.g. adhesive, nuts and bolts, perforated printed circuit board (PCB), etc.), or electrical means (e.g. electrical traces, magnetism, solder joints, etc.). In some embodiments of the system 100, the tab 104 can be on the same printed circuit board (PCB) as the device 102; the tab 104 section may be surrounded by perforation holes for easy removal. The tab 104 can have a serial number (e.g. a barcode, printed label, etched number, etc.), which can correspond to a serial number of the electronic device 102; the serial number of the device 102 may be readily visible, although in some examples, the number may be covered.

Figure 1B:
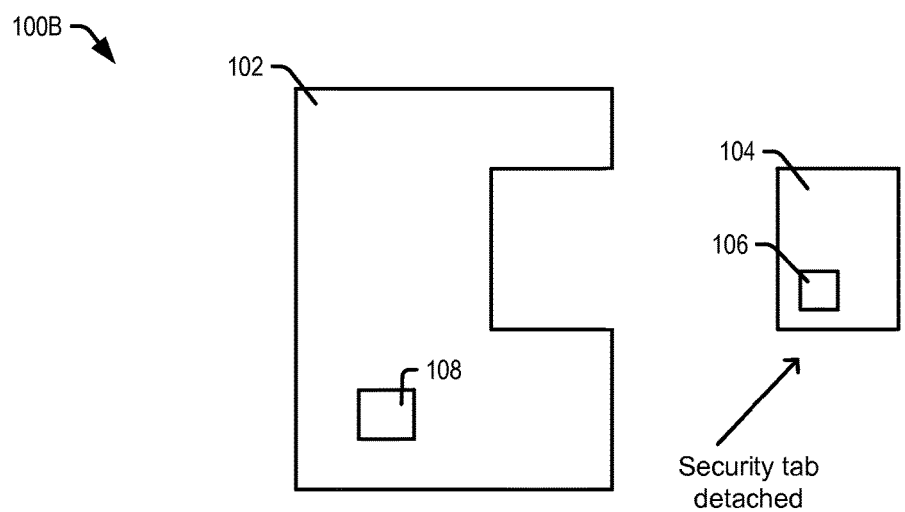
FIG. 1B is a system of visual security device, in accordance with certain embodiments of the present disclosure.

The security circuit 106 may include encryption or decryption circuitry configured to decrypt encrypted data from a memory or an encryption key, a memory storing an encryption key, a pseudo random number generator, other security circuits or any combination thereof. The security circuit 106 may also be a circuit programmed into the tab 104 via an etching device (e.g. laser cutter), or sometime during the manufacturing process of the tab 104; the etched circuit can contain a series of binary values (e.g. ones and zeros), which may be read by the device 102 and compared against stored values, or by using key material to cryptographically intertwine with other key material stored on the device. Referring to FIG. 1B, a system with visual security device is shown and is generally designated 100B. The system 100B can be an embodiment of system 100A.

System 100B can have an electronic device 102 coupled to a breakaway tab 104. The breakaway tab 104 can include a security circuit 106, which can be a security key, an encryption circuit, a memory, or other circuit(s). FIG. 1B shows system 100 in a second state where the breakaway tab 104 is de-coupled from the electronic device 102. The electronic device 102 can also have stored instructions 108 that have been disabled and cannot be run by a processor, controller, or other circuit (not shown).

The breakaway tab 104 can be physically and permanently removed from the electronic device 102. When the security circuit 106 is removed from the device 102, some or all of the functions 108 may be disabled, and may not be executable by the device 102. In some embodiments, data may become permanently inaccessible. In other embodiments, the electronic device can be repurposed; some functions or data may be accessible even though specific selected functions are disabled due to the tab 104 being removed. For example, a communication device may be permanently prohibited from communicating across a frequency range, but may continue to communicate across another frequency range. Data already stored in a data storage device may be inaccessible such as by loss of an encryption or decryption key, but new data does not have the same encryption or decryption may be recorded and accessed. In other examples, there may be more than one tab 104, where each tab 104 can be associated with one or more functions. A user may selectively break away a tab 104 corresponding to a function(s) or data that they want to permanently prohibit access to without affecting other functions or data.

The device 102, tab 104, or security circuit 106 can include circuits that can detect an attempt to re-attach the tab 104, or substitute the original tab 104 with an alternate device. For example, the device 102 can include a pseudorandom number generator that can be synchronized with a pseudorandom number generator of the circuit 104. When the tab 104 is removed, the pseudorandom number generator in the device 102 may no longer be synchronous with the random number generator of the security circuit 106. In another example, the device 102 may perform a circuit impedance check, a circuit resistance check, a unique identification check, another check, or any combination thereof.

In some embodiments, the tab 104 may have been removed from the device 102, and then, when the device 102, tab 104, or the device 102 and the tab 104 is powered on the authentication information stored in the device 102, or tab 104, can be cleared. In some situations, the device 102 may be powered up from a powered down state, which can trigger the authentication information stored in the device 102 to be cleared if the tab has been removed. Additionally, authentication information stored in a remaining attached portion of the tab 104 may be cleared. In some embodiments, the tab 104 may have a separate power source (e.g. a battery), which may enable the tab 104 to operate even though the device 102 is powered down. The tab 104 can perform a self-check, and may clear stored authentication information upon detection of its removal from the device 102.

The tab 104 can be configured such that when it is pulled, twisted, snapped, torqued, crushed, etc., the security circuit 106 is physically broken. Some or all of a portion of the tab 104 may remain attached to the device 102, placed under a tamper evident seal, located in an immediately inaccessible portion of a device (e.g. within an enclosed frame), or other locations or any combination thereof. In addition, the tab 104 may be coupled to a tamper responsive enclosure, such as an enclosure with one or more sensors that can detect tampering or opening. For example, when the tab 104 is removed from the circuit 102, data in a data storage device can be erased (e.g. degaussed, overwritten, etc.) automatically, in addition to any encryption consequences that may result.

In some embodiments, the system 100 can be configured to permanently disable functions or restrict access to data when the device is removed from an enclosure. For example, the data storage device tab 104 (breakaway lever or other mechanism) can be configured to break or be automatically removed when the device 102 is removed from another system, such as a server rack, a desktop chassis, a host computer, a phone, an automobile, an airplane, and so forth.

Figure 2:
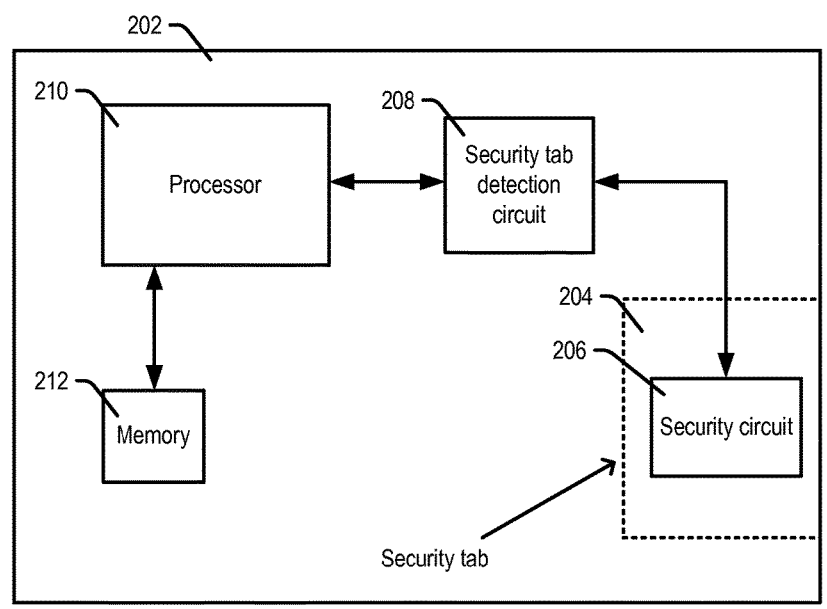
FIG. 2 is a system of visual security device, in accordance with certain embodiments of the present disclosure.

Referring to FIG. 2, a system of visual security device is shown and is generally designated 200. The system 200 can be an embodiment of system 100. System 200 can include a device 202, which may be a communication device, a data storage device, or other device. The device 202 can include a memory 212 (e.g. volatile memory, non-volatile memory, etc.) coupled to a processor, controller, or other circuit 210, and a security tab detection circuit 208 coupled to the processor 210. The security tab detection circuit 208 may also be coupled to a one time removable security tab 204, which may include a security circuit 206. In some examples, the breakaway tab 204 may include multiple circuits, including etched circuits, logic circuits, electric traces, or other circuits that can be configured to communicate with the security key detection circuit 208.

In some embodiments, the security tab detection circuit 208 may check for the presence of the breakaway tab 204. When the breakaway tab 204 is present, the security key detection circuit can detect a presence of the security circuit 206. The security tab detection circuit 208 can also retrieve authentication information (e.g. serial numbers, keys, passwords, unique IDs, inductance measurements, resistance measurements, or any combination thereof) from the breakaway tab 204. In some examples, the device 202 may include a pseudorandom number generator, which may be synchronized with a pseudorandom generator of the security circuit 206. The security circuit 206 may store the pseudorandom numbers in a volatile memory, such that when the tab 204 is removed from the device 202, the memory may lose power, which may result in the loss of the stored, synchronized pseudorandom numbers. In other examples, the tab 204 can include tamper detection circuitry that results in the loss of the stored or synchronized pseudorandom numbers in response to a tamper event being detected at the device 202 or at the tab 204. For example, the tamper detection circuitry may initiate an erase or desynchronizing of the stored pseudorandom numbers.

The security tab detection circuit 208 can provide the status of the breakaway tab 204, including authentication information, to the processor 210. The processor 210 may permanently prevent access to, or use of the device 202, function(s), data, or any combination thereof. For example, the processor may prohibit access to the device 202, function(s) or data when the security tab detection circuit 208 indicates that the tab 204 is not present. In other examples, the security tab detection circuit 208 can provide authentication information to the processor when the tab 204 is present. The processor may compare the authentication information provided by the detection circuit 208 to authentication information stored in the memory 212. When the authentication information provided by the security key 206 and the authentication information stored in the memory 212 are not substantially the same, the processor may prohibit access to the device 202, prohibit access to function(s), permanently prohibit the knowledge (e.g. access) of calculated keys, or prohibit access to data.

Additionally, when the presence of tab 204 is not detected, the processor 210 may execute instructions stored in the memory 212, or other memory, that can prevent the device 202 form working such as by causing physical damage to the device 202, disabling the device's ability to perform certain functions, or physically erasing or otherwise destroying data on a disc (e.g. degaussing, scratching a disc with a recording head, formatting a memory, etc.). Functions, such as communication functions, may be physically disabled by short circuiting components, or by briefly exposing a circuit to a voltage higher than a maximum specified rating. In some examples, both the device 202 and the breakaway tab may have separate authentication keys. The processor 210, or other circuit, such as a logic circuit, can combine the keys via a function, such as an exclusive or operation. When either the device's 202 authentication key or the tab's 204 security key is missing or substantially incorrect, the processor 210, or other circuit, can permanently prohibit access to the device 202, function(s), or data.

In some embodiments, the security tab 204 or the security circuit 206 can include an encryption circuit configured to encrypt data, or a decryption circuit configured to decrypt data, such as data stored in a data storage device. In some examples, the security circuit 206 can be configured to encrypt data as well as decrypt data. The decryption circuit may decrypt data received from a data storage device, provide it to a circuit, such as the processor 210 or the memory 212, where it may be used in the system. When the tab 204 is broken or removed, the decryption circuit and key are removed from the device 202, and the encrypted data cannot be decrypted, which should make the encrypted data inaccessible.

Figure 3:
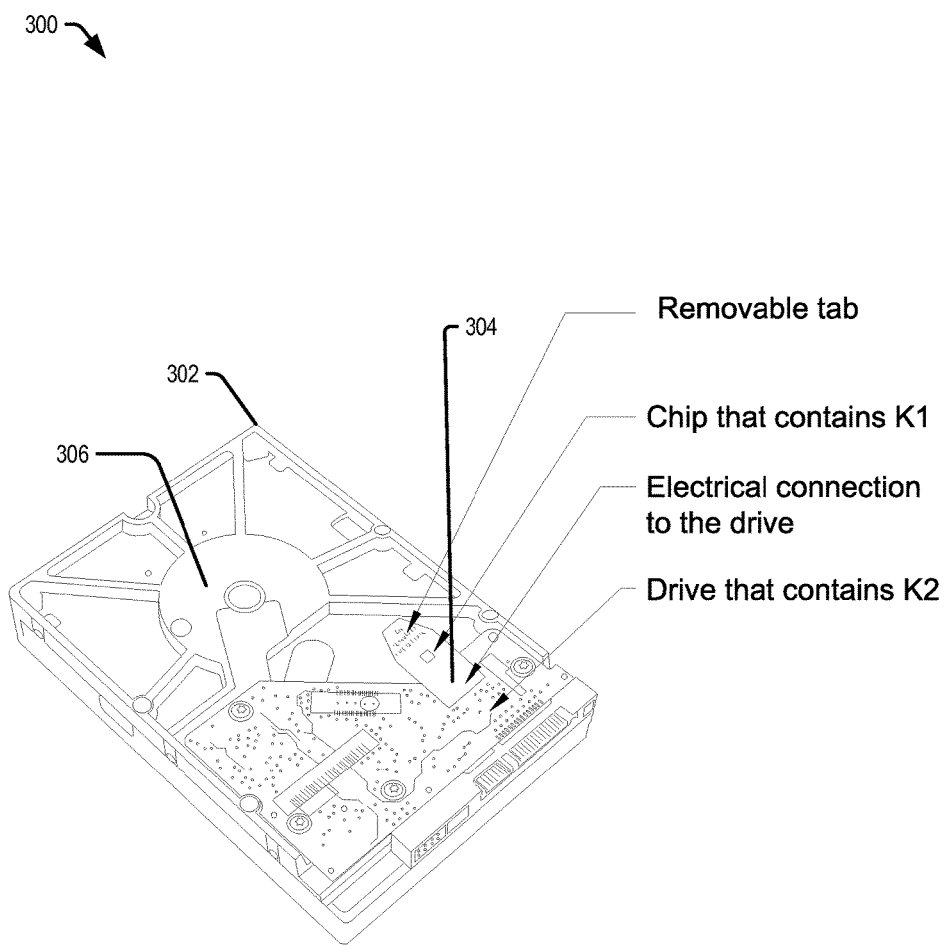
FIG. 3 is a system of visual security device, in accordance with certain embodiments of the present disclosure.

Referring to FIG. 3, a system of visual security device is shown and generally designated 300. The system 300 can be an embodiment of systems 100 and 200. The system 300 can include a data storage device (DSD) 302, having a printed circuit board (PCB) 306 and a removable tab 304, which can be removed and retained by a user. The removable tab 304, which may be constructed of plastic, metal, ceramics, silicon, glass, other material, or any combination of materials, and may contain authentication circuits, encryption circuits, memory, other circuits, or any combination thereof. The removable tab 304, may be a lever or other mechanism configurable to be removed and not reattachable. For example, the part of the removable tab 304, the PCB 306, or both may be physically broken when the removable tab 304 is detached from the PCB 306.

In some embodiments, the DSD 302 may be configured to encrypt data before storing it to the disk. The system 300 can access the encrypted data via a two key encryption method; one key, k1, may be included in a memory or controller coupled to the PCB 306, and another key, k2, may be stored in a memory on the removable tab 304. The keys can store a series of symbols, numbers, or other values, and both keys are required to access the data. In systems with more than two keys, more than two keys may be required for data access. In some examples, key k1, and key k2 may be combined (e.g. via an exclusive OR function) to produce a combined key that can be compared with another key associated with the DSD 302. The combined key can be used for authentication of the removable tab 304, or can be used for encryption or decryption of data to be stored to a non-volatile memory. When at least one of either k1 or k2 is not available, access to the DSD 302 or specific functions of the DSD 302 will be denied because the combined key cannot be generated. The system 300 can check for the presence of the keys at triggers (e.g. system power on, reset, shutdown, periodically, etc.).

For example, a "root key" of the device could be calculated by K=k1+k2, where + is the XOR function. The key "k1" can be on the tab and the key "k2" can be on the device. Thus, if k1 is unknown when the information on the device is fully encrypted by K, there is not enough information left in the device to determine K without k1; therefore, the data encrypted by K cannot be decrypted. A pseudorandom stepping function can be used such as K=k1(n)+k2(n) where n is incremented on each use in such a way as if an attacker listens to the electrical conversation between the tab and the device, and the attacker knows k1(x) where x<n it may be computationally infeasible to calculate k1(n).

In some embodiments, the DSD 302 can be secured to another device, such as a server rack, a computer chassis, or other hardware. The removable tab 304 can be physically coupled to the other device, and can be configured to be automatically removed from the DSD 302 when the DSD 302 is removed from the other device.

Figure 4:
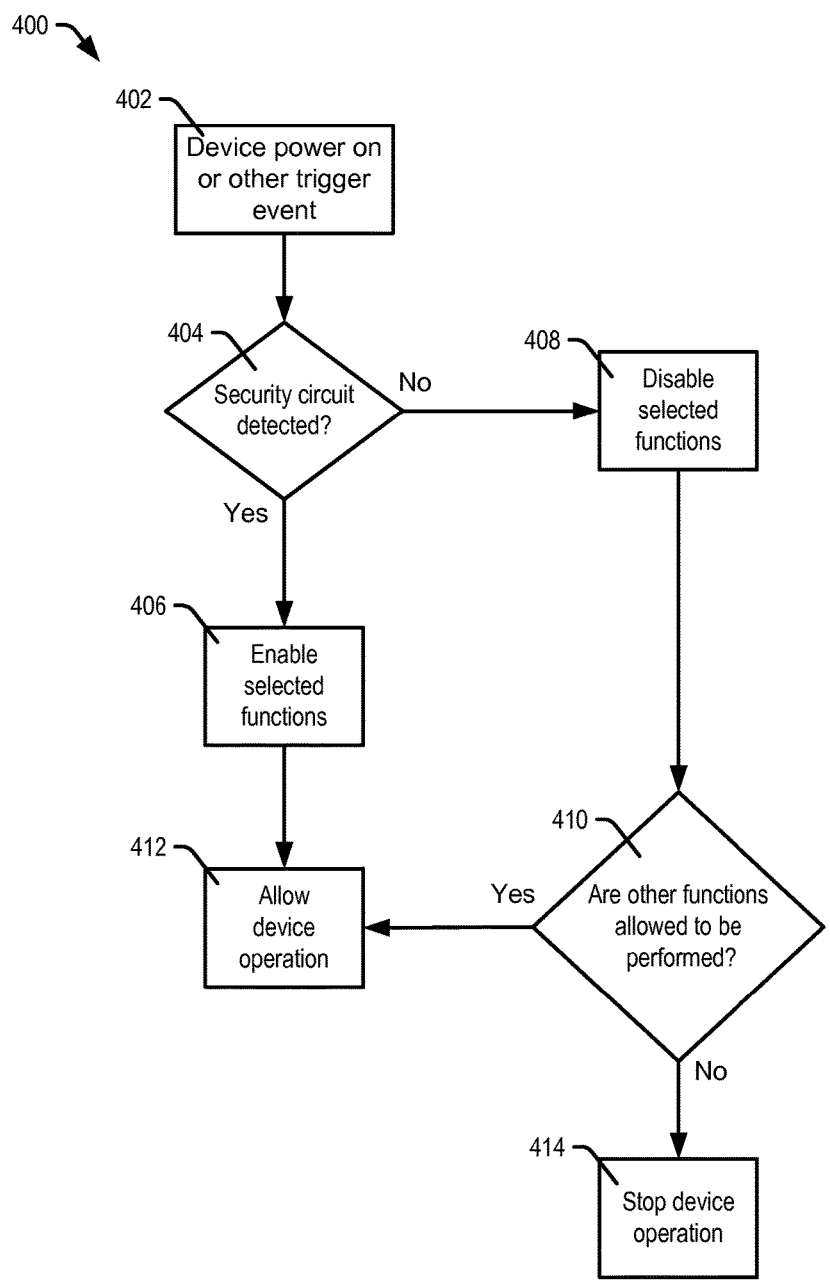
FIG. 4 is a flowchart of a method of a visual security device, in accordance with certain embodiments of the present disclosure.

Referring to FIG. 4, a method of visual security device is shown and is generally designated 400. The method 400 can be implemented in the example embodiments of systems 100, 200, or 300. When a device, such as a data storage device, is power cycled, the device may determine if a security circuit is present at 404. In some examples, however, the device may check for a security circuit at other times, such as during reset, at a preset time(s), upon detection of an indicator, and so forth. When the security circuit is detected, at 404, the device can enable selected function(s), such as data access or decryption, at 406, and the device operation can continue at 412.

When the security circuit is not detected, at 404, the device may permanently disable selected function(s) or the device at 408. For example, the device may disable data transmission, data processing, data generation, and so forth. The device can also determine if other functions are allowed to be performed at 410; some functions or data may still be accessible even though other functions or data are restricted. For example, access to data encrypted prior to the removal of the security circuit may be prohibited, but new data may be stored to the memory and later accessed. When other functions are allowed, at 410, the device may continue to operate, at 412. When no other functions are allowed, at 410, that is the device is completely disabled, the device may halt current and future operations, at 414. Further, when the device may break or otherwise render physically unusable the selected functions or data, whether or not other functions are allowed to be performed.

The illustrations, examples, and embodiments described herein are intended to provide a general understanding of the structure of various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, the figures and above description provide examples of architecture that may be varied, such as for design requirements of a system. Moreover, although specific embodiments have been illustrated and described herein, it should be appreciated that any subsequent arrangement designed to achieve the same or similar purpose may be substituted for the specific embodiments shown.

This disclosure is intended to cover any and all subsequent adaptations or variations of various embodiments. Combinations of the above examples, and other embodiments not specifically described herein, will be apparent to those of skill in the art upon reviewing the description. Additionally, the illustrations are merely representational and may not be drawn to scale. Certain proportions within the illustrations may be exaggerated, while other proportions may be reduced. Accordingly, the disclosure and the figures are to be regarded as illustrative and not restrictive.

What is claimed is:

1. A device comprising:
a data storage medium;
a breakaway tab including a security apparatus having a security circuit, the breakaway tab being configured to be broken away;
a circuit coupled to the security apparatus configured to:
allow execution of one or more functions based on a presence of the security apparatus;
disable execution of the one or more functions when the presence of the security apparatus is not detected; and
the security apparatus adapted to be removed from the circuit by the breaking away of the breakaway tab and not reattachable to the circuit after the breakaway tab is broken away, the one or more functions including accessing data stored to the data storage medium prior to removal of the security apparatus from the circuit.

2. The device of claim 1 further comprising:
the security apparatus is visible on an exterior of the device and adapted to allow a user to remove the security device to disable the one or more functions.

3. The device of claim 1 further comprising:
the circuit configured to allow the use of the data storage medium for storing other data that is not data stored to the data storage medium prior to removal of the security apparatus from the circuit when the security apparatus is removed from the circuit.

4. The device of claim 1 further comprising:
an interface adapted to physically connect and physically disconnect from a host computer and adapted to receive data from the host computer;
the data storage medium adapted to store encrypted data; and
the circuit comprises a data storage controller coupled to the interface and the data storage medium, the data storage controller configured to allow decryption of the encrypted data when the security apparatus is coupled to the circuit and to not allow decryption of the encrypted data when the security apparatus is not coupled to the circuit.

5. The device of claim 4 further comprising:
the data storage controller configured to allow use of the data storage medium for storing other data that is not the encrypted data when the security apparatus is not coupled to the circuit.

6. The device of claim 4 further comprising:
the security apparatus includes one or more security apparatus decryption keys, and the circuit includes one or more circuit decryption keys;
the circuit is configured to not allow access to the encrypted data when any one of the one or more security apparatus decryption keys or any one of the one or more security keys cannot be verified by the circuit.

7. The device of claim 4 further comprising:
the device includes a first pseudo-random number generator (PRNG);
the security apparatus includes a second PRNG configured to be initially synchronized with the first PRNG; and
volatile memory configured to store a pseudo-random number so long as the security apparatus is coupled to the device.

8. The device of claim 4 further comprising:
the security apparatus is configured to cause physical damage to a connection between the device and the security apparatus when the security apparatus is removed from the device; and
wherein a removed security apparatus is visible to a person inspecting the device.

9. The device of claim 5 further comprising:
the security circuit of the security apparatus includes a decryption circuit storing a decryption key; and
the circuit is configured to decrypt data stored to the device using the decryption key stored to the security apparatus.

10. The device of claim 7 further comprising:
the circuit is further configured to detect attempts to reattach the security apparatus, including comparing an output from the first PRNG against an output of the second PRNG.

11. The device of claim 5 further comprising:
the other data is encrypted by another encryption process that is different than a first encryption process used to encrypt the encrypted data.

12. A device comprising:
a breakaway tab including a security apparatus, the breakaway tab being configured to be broken away;
the security apparatus including a security circuit and an attachment mechanism adapted to allow a one-time removal of the security apparatus from a circuit to which the security apparatus is coupled, the security apparatus adapted to be removed from the circuit by the breaking away of the breakaway tab and not reattachable to the circuit after the breakaway tab is broken away; and
the circuit includes one or more circuits configured determine if the security apparatus is coupled to the circuit, and to not allow access to one or more functions when the security apparatus is not coupled to the circuit, the one or more functions including access to data that was stored to a memory of the device prior to removal of the security apparatus from the circuit.

13. The device of claim 12 further comprising:
the circuit includes a detection circuit coupled to the security apparatus and configured to determine the presence of the security apparatus; and
the detection circuit is further configured to provide a processor with information pertaining to the presence of the security apparatus.

14. The device of claim 13 further comprising:
the detection circuit checks a security key stored in the security apparatus and authenticates the security apparatus based on the security key.

15. The device of claim 13 further comprising:
the detection circuit includes a first pseudorandom number generator synchronous with a second pseudorandom generator included in the security apparatus;

the second pseudorandom number generator stores a pseudorandom number in a volatile memory coupled to a power source from the circuit;

the detection circuit is configured to authenticate the security apparatus based on the pseudorandom number compared to another pseudorandom number from the first pseudorandom number generator; and the volatile memory and the second pseudorandom number generator are configured to lose power when the security apparatus is removed from the circuit.

16. The device of claim 13 further comprising:

the circuit has at least one first security key;

the security apparatus has at least one second security key; and the detection circuit is configured to combine the at least one first security key and the at least one second security key to produce a combined security key; and the detection circuit is further configured to compare the combined security key with a predetermined value.

17. The device of claim 12 further comprising:

the circuit includes an impedance measuring circuit configured to measure an impedance corresponding to the security apparatus; and the circuit will not allow access to one or more functions when the impedance corresponding to the security apparatus is not substantially the same as a predetermined impedance value.

18. A method comprising:

physically removing a breakaway tab including a security apparatus from a device to permanently prevent access to one or more functions of the device, the removal of the breakaway tab decoupling the security apparatus from the device;

determining, via the device, when the security apparatus is not coupled to the device; and permanently prohibiting, via a processor of the device, access to the one or more functions when the security apparatus is not coupled to the device, the one or more functions including accessing data stored to a data storage medium of the device prior to removal of the security apparatus from the circuit.

19. The method of claim 18 further comprising:

triggering an event whereby a first circuit of the devices determines if a security circuit of the security apparatus is coupled to the first circuit;

permanently prohibiting, via the processor, access to the one or more functions when the security circuit is not coupled to the first circuit;

determining, via the device, if other functions other than the one or more functions are allowed to be accessed even though access to the one or more functions has been permanently removed; and allowing access to the other functions when access is permitted.

20. The device of claim 12 further comprising:

the circuit configured to allow the use of the memory for storing other data that is not data stored to the memory prior to removal of the security apparatus from the circuit when the security apparatus is removed from the circuit.

* * * * *